United States Patent [19]
Koorey et al.

[11] Patent Number: 5,139,222
[45] Date of Patent: Aug. 18, 1992

[54] BEVERAGE CONTAINER HOLDING APPARATUS

[76] Inventors: Douglas Koorey, 1945 Station Rd., Valley City, Ohio 44280; Patricia Burgess, 28280 N. Park, North Olmsted, Ohio 44070

[21] Appl. No.: 756,675

[22] Filed: Sep. 9, 1991

[51] Int. Cl.⁵ .............................................. A47K 1/08
[52] U.S. Cl. ................................. 248/311.2; 211/88; 248/315
[58] Field of Search ............... 248/311.2, 293, 309.1, 248/312.1, 315; 211/71, 75, 81, 88; 220/483, 480, 481, 85 H; 224/42.45 R

[56] References Cited
U.S. PATENT DOCUMENTS

| | | | |
|---|---|---|---|
| 2,289,701 | 7/1942 | Engel | 248/311.2 |
| 2,427,416 | 9/1947 | Petersen | 220/481 X |
| 2,471,030 | 5/1949 | Foulke | 224/42.45 R |
| 2,649,270 | 8/1953 | Franks | 248/311.2 |
| 2,903,225 | 9/1959 | Weinstein | 248/311.2 |
| 3,233,858 | 2/1966 | Benjamin | 248/311.2 |
| 3,365,228 | 1/1968 | Hay | 248/311.2 |
| 3,568,966 | 3/1971 | Lucci | 248/154 |
| 4,191,350 | 3/1980 | Ormond . | |
| 4,434,961 | 3/1984 | Hoye . | |
| 4,530,480 | 7/1985 | Pratt . | |
| 4,738,423 | 4/1988 | DiFillippo et al. . | |
| 4,749,112 | 6/1988 | Harper | 224/42.45 R |
| 4,828,211 | 5/1989 | McConnell et al. . | |
| 4,887,784 | 12/1989 | Kayali . | |
| 4,892,281 | 1/1990 | DiFillippo et al. . | |
| 4,907,775 | 3/1990 | Lorence et al. . | |
| 4,984,722 | 1/1991 | Moore . | |

Primary Examiner—J. Franklin Foss
Attorney, Agent, or Firm—Ralph E. Jocke

[57] ABSTRACT

A beverage container holding apparatus (10) for holding conventional cups of various sizes and conventional beverage cans, includes a body (12). An outer ring member (22) and an inner ring member (32) are pivotally mounted to the body by a pin (40). Large and small cups (52, 60) are supported in generally circular openings (24, 34) by supporting edges (25, 35) in the inner and outer ring members respectively. A conventional can (62) is supported in the inner ring member and on a finger (42) which projects outward from a lower portion of the body. The finger has an upturned end (44) which is adapted to be accepted in a recess in the bottom of the can. The finger also serves to hold the inner ring member in a retracted position when it is not in use. A tab (46) on the lower portion of the body holds the outer ring member in the retracted member when the outer ring member is not in use.

20 Claims, 7 Drawing Sheets

BEVERAGE CONTAINER HOLDING APPARATUS

TECHNICAL FIELD

This invention relates to devices for holding beverage containers. Particularly this invention relates to an apparatus for holding various types of beverage containers in the upright condition without spillage, which apparatus is retractable to conserve space when not in use.

BACKGROUND ART

Various types of containers are typically used for holding beverages. The most common are "paper" or "Styrofoam" beverage cups, and aluminum cans. Such cups come in various sizes. However most cups are circular in cross section and have an open top and a closed bottom. Such cups typically have a side wall that is tapered outwardly from the bottom toward the top. This results in the cup being wider at the top than at the bottom.

Virtually all common beverage cans are cylindrical and have a straight side wall, a closed bottom and a top that includes a "flip top" opening. Common beverage cans are similar in diameter, and because most contain 12 fluid ounces, they are the same height. This enables beverage cans to be dispensed from vending machines. Common aluminum beverage cans also have a dome-shaped recess in the bottom wall of the can.

Beverages are commonly sold in cups or cans at drive through fast food restaurants, in movie theaters and at sporting events. When beverages are provided in such circumstances it may be difficult to find a location to keep the container where it will not spill. As a result, the beverage container often has to be held in hand to avoid spillage.

It is also common for people to drink beverages while they are driving a car, van or boat. In a vehicle it is difficult to find a location to place the beverage where it will not tend to spill. As a result, beverage containers in moving vehicles typically have to be held in hand to avoid spillage.

In the past, some cars and vans have been equipped with areas that have circular recesses for holding beverage containers. Some theater seats have also been equipped with similarly configured beverage holders. The drawback associated with these types of beverage holders is that they take up space even when they are not in use. Another disadvantage of such beverage holders is that they are adapted for holding only one diameter of cup or can. They cannot effectively hold large cups that have a greater diameter than the diameter of the recess. In addition, cups or cans that are smaller than the diameter of the recess may move around the area and may spill.

Others have previously sought to develop beverage can and cup holders that retract when they are not in use to conserve space. Examples of such items are shown in U.S. Pat. Nos. 4,191,350; 4,738,423; 4,828,211; 4,434,961; 4,530,480; 4,984,722; 4,887,784; 4,892,281; and 4,907,775. All of these prior art devices are relatively complex and expensive to manufacture. In addition they are not readily installed in existing vehicles or on existing structures such as theater or stadium seats. Most of these prior art devices may not be used to hold a full range of beverage cups and cans.

Thus, there exists a need for an apparatus for holding beverage cups of various sizes as well as cans, that reliably holds such items without spillage, is retractable to conserve space when not in use and which is inexpensive to manufacture and install.

DISCLOSURE OF INVENTION

It is an object of the present invention to provide an apparatus for holding beverage cups of various sizes without spillage.

It is an object of the present invention to provide an apparatus for holding common beverage cans without spillage.

It is an object of the present invention to provide an apparatus adapted for holding both various sized beverage cups and cans.

It is an object of the present invention to provide an apparatus for holding various types of beverage containers that can be retracted when not in use to conserve space.

It is an object of the present invention to provide an apparatus for holding various types of beverage containers that is economical to manufacture.

It is an object of the present invention to provide an apparatus for holding various types of beverage containers that may be readily installed in vehicles.

It is an object of the present invention to provide an apparatus for holding various types of beverage containers that may be readily installed on existing structures such as the backs of theater or stadium seats.

It is an object of the present invention to provide an apparatus for holding various types of beverage containers that may be attached and used on supporting surfaces that extend at an angle that varies from vertical and which may be subject to movement.

Further objects of the present invention will be made apparent in the following Best Mode For Carrying Out Invention an the appended claims.

The foregoing objects are accomplished in the preferred embodiment of the invention by an apparatus having a body which is attached to a supporting surface. The supporting surface is a generally vertically extending surface. However, the supporting surface may deviate from the vertical to a fair degree as in the case of an angled back of a theater or stadium seat. The body of the apparatus of the present invention is held to the supporting surface by screws, but in other embodiments other fasteners or adhesive material may be used.

The apparatus includes a first movable ring member that has a first circular opening therein. The opening is bounded by a first circumferential edge. The first circular opening in the first ring member is somewhat larger than the diameter of a standard 12 ounce beverage can. The first ring member is pivotally mounted to the body by a pin. The first ring member is movable between a first position wherein it extends in a generally horizontal direction and a second position wherein it is retracted adjacent to the supporting surface.

The apparatus further includes a second movable ring member that has a second generally circular opening therein. The second circular opening is bounded by a second circumferential edge. The second opening is sufficiently large that the first ring member may pass therethrough. The second ring member is pivotally mounted to the body coaxially with the first ring member by the pin. The second ring member is movable between a first position wherein it extends in a generally horizontal direction and a second position wherein it is retracted to adjacent the supporting surface.

The body of the apparatus includes an integral finger that extends outward from the supporting surface at a location vertically below the pivot. The finger includes an upturned end. The finger passes inside and in abutting relation with the first opening in the first ring member when said member is retracted in the second position adjacent the supporting surface. The finger serves to latch the first movable member in the second position until it is manually moved therefrom.

The body further includes a tab. The tab is positioned vertically below and in abutting relation with the second ring member when the second ring member is retracted in the second position. The tab serves to latch the second ring member in the retracted position until it is manually moved therefrom.

When the apparatus is not in use, both ring members are latched in the second position adjacent the supporting surface. Both ring members are of uniform thickness so they lie flush with one another. In this position they are out of the way to conserve space and to avoid damage as the result of being bumped.

The body of the apparatus further includes a central rounded portion. In the retracted position of the ring members, the central portion may be viewed through the opening in the first ring member. The central portion of the body is adapted to contain advertising or promotional material.

When it is desired to use the apparatus for holding a beverage cup having an outwardly tapered side wall, the appropriate sized ring member is unlatched and extended towards the horizontal position. The cup is then inserted bottom end first through the ring member. The ring member is sized so that it will accept the bottom of the cup, but because of the tapered side wall, the top of the cup will not pass through the opening in the ring member. As a result, the cup may be moved downward through the opening in the ring member until it reaches a location where the diameter of the cup is equal to the diameter of the opening. In this position the wall of the cup is supported circumferentially by the supporting edge of the opening.

When one ring member is used to hold a beverage container the other ring member not in use remains latched in the second position. Small cups may be typically supported in the first ring member while larger cups may be supported in the second ring member.

When it is desired to hold a beverage can in the apparatus the first ring member is extended toward the horizontal position and the can is inserted vertically through the opening therein with the bottom down. The can is moved downward through the opening until one side of the bottom of the can is supported by the finger extending outward from the body. In this position the top of the can continues to extend above the ring member. The upturned end of the finger is accepted into the dome shaped recess in the bottom of the can which adds further stability.

BEST MODE FOR CARRYING OUT INVENTION

Figure 1:
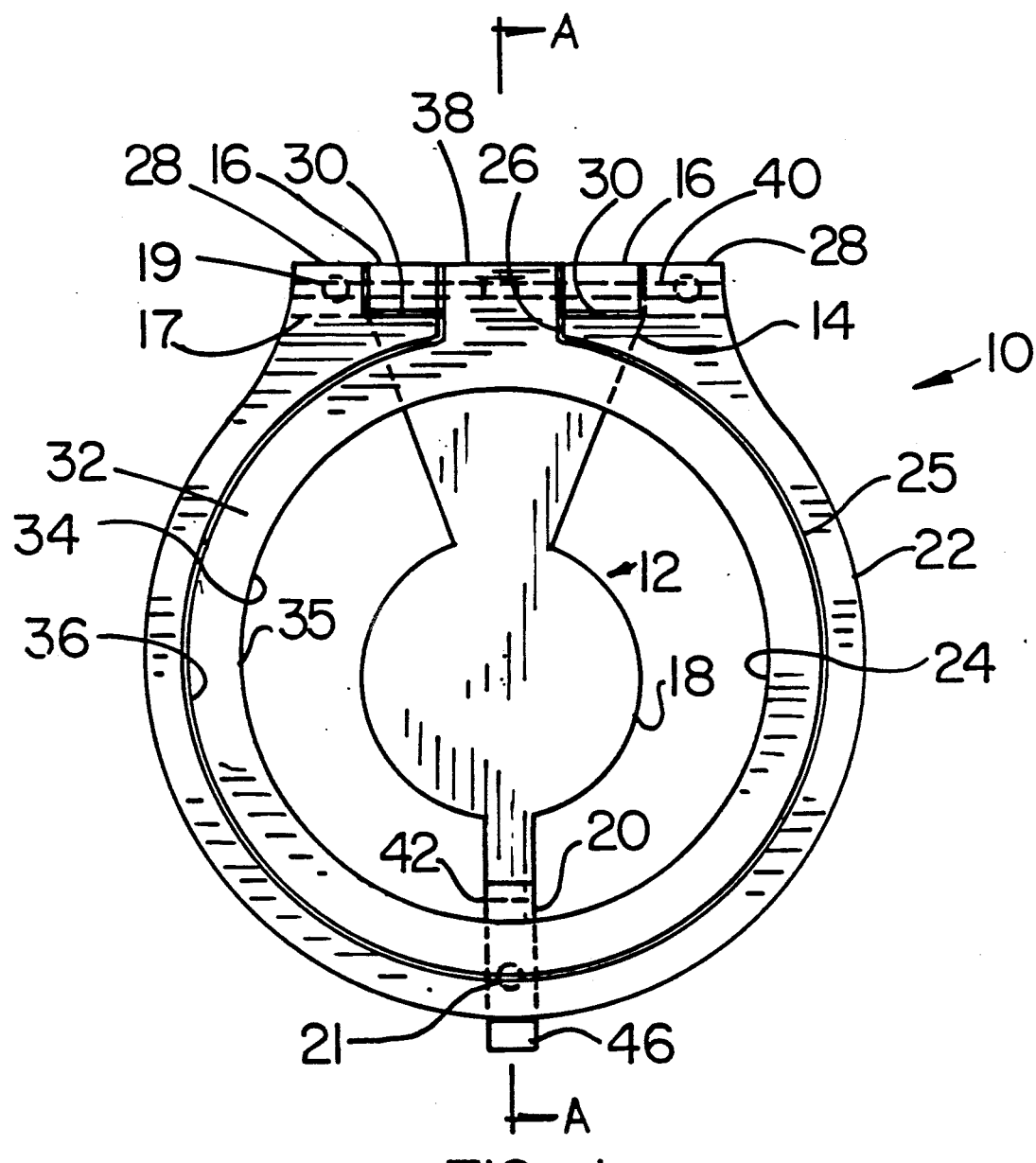
FIG. 1 is a plan view of the beverage container holding apparatus of the preferred embodiment of the present invention in the retracted condition.

Referring now to the drawings and particularly to FIG. 1, there is shown therein the preferred embodiment of the beverage container holding apparatus of the present invention generally indicated 10. The apparatus has a body 12. Body 12 has a top portion 14 which includes two integral forward projecting ears 16. The top portion also includes two laterally extending tabs 17 with countersunk mounting holes 19 therethrough. The body also includes a rounded central portion 18 and a lower portion 20 later described in detail. Lower portion 20 includes a countersunk mounting hole 21 therethrough.

The apparatus includes an outer ring member 22. Outer ring member 22 has a generally circular opening 24 therein. Opening 24 has aperture diameter which in the preferred form of the invention is three and one-half inches. Opening 24 is bounded by a circumferential edge 25. Ring member 22 includes a central cutout 26 in the area between the ears of the body member. Member 22 also includes outer portions 28 which extend outboard of ears 16. Undercuts 30 are provided in member 22 adjacent the ears 16 of the body member so that the outer portions 28 of the outer ring member 22 extend flush with ears 16 when the ring member is in the position shown in FIGS. 1 through 3.

The apparatus also includes an inner ring member 32. Inner ring member 32 has a circular opening 34 therein. Opening 34 has an aperture diameter that in the preferred form of the invention is three inches. Opening 34 is bounded by a circumferential edge 35.

Inner ring member 32 has a circular outer wall 36 that is slightly smaller in diameter than the aperture diameter of circular opening 24 in the outer ring member 22. This enables inner ring member 32 to nest inside outer ring member 22 when the rings are in the position shown in FIGS. 1 through 3.

Inner ring member 32 also has a neck portion 38 that extends through cutout 26 in the outer ring member. Neck portion 38 extends flush with the top of ears 16 of the body and outer portions 28 of the outer ring member when the inner ring member is in the position shown in FIGS. 1 through 3.

A hole (not separately shown) extends through ear 16 and is aligned with similarly sized holes in outer portions 28 of outer ring member 22 and neck portion 38 of inner ring member 32. A split pin 40 extends through outer portions 28 ears 16 and into neck portion 38. This construction serves as pivot means for enabling the inner and outer ring members to coaxially pivot about pin 40.

Figure 2:
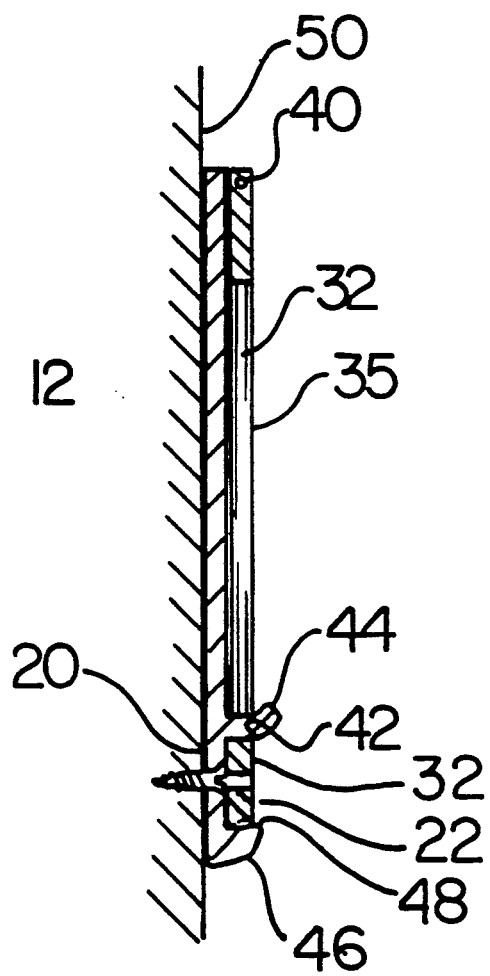
FIG. 2 is a sectional view of the beverage container holding apparatus taken along line A—A in FIG. 1.

As best shown in FIG. 2, lower portion 20 of body 12 includes an outwardly extending integral finger 42. Finger 42 has an upturned end 44, the purpose of which is described later. As shown in FIG. 1, finger 42 extends adjacent and in abutting relation to the circular opening 34 in inner ring member 32 when the ring is in the position shown in FIGS. 1 through 3. The lower wall of finger 42 slightly interferes with inner ring member 32 to hold the ring member in the retracted position until it is manually moved therefrom.

A tab 46 projects outwardly from the bottom of lower portion 20 of body 12. An upper wall 48 of tab 46 is adjacent and in abutting relation with the outer wall of outer ring member 22 when the outer ring member is in the position shown in FIGS. 1 through 3. A slight interference is provided between tab 46 and the outer ring member 22 which serves to hold the ring member in the position adjacent the tab until it is manually moved therefrom.

In the preferred form of the invention, the body and ring members are made from plastic material. The plastic material provides for slight deformation of abutting parts of inner ring member 32 and finger 42, as well as outer ring member 22 and tab 46. The abutting surfaces thereof are angled such that the rings can be "snapped" into and out of the position shown in FIGS. 1 through 3.

Figure 3:
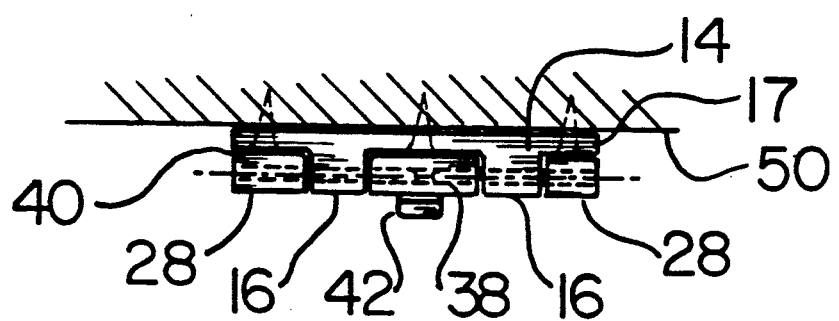
FIG. 3 is a top view of the beverage container holding apparatus in the retracted position.

The operation of the beverage container holding apparatus of the present invention is described with reference to FIGS. 4 through 7. In use the apparatus is mounted to a supporting surface 50. As best shown in FIGS. 2 and 3, in the preferred embodiment the body is fixed to the supporting surface with screws which extend through holes 19 in the upper tabs and hole 20 in the lower portion of the body. However, in other embodiments other types of fastening means may be used. Supporting surface 50 is a generally vertically extending surface. However, it should be understood that a generally vertically extending surface for purposes of the invention may includes surfaces that extend at substantial angles from vertical, such as the backs of reclining stadium, theater, airplane, boat or automobile seats. The supporting surface may deviate from the vertical direction to the extent that the beverage container may be supported in the apparatus sufficiently upright so that there is no spillage.

Figure 4:
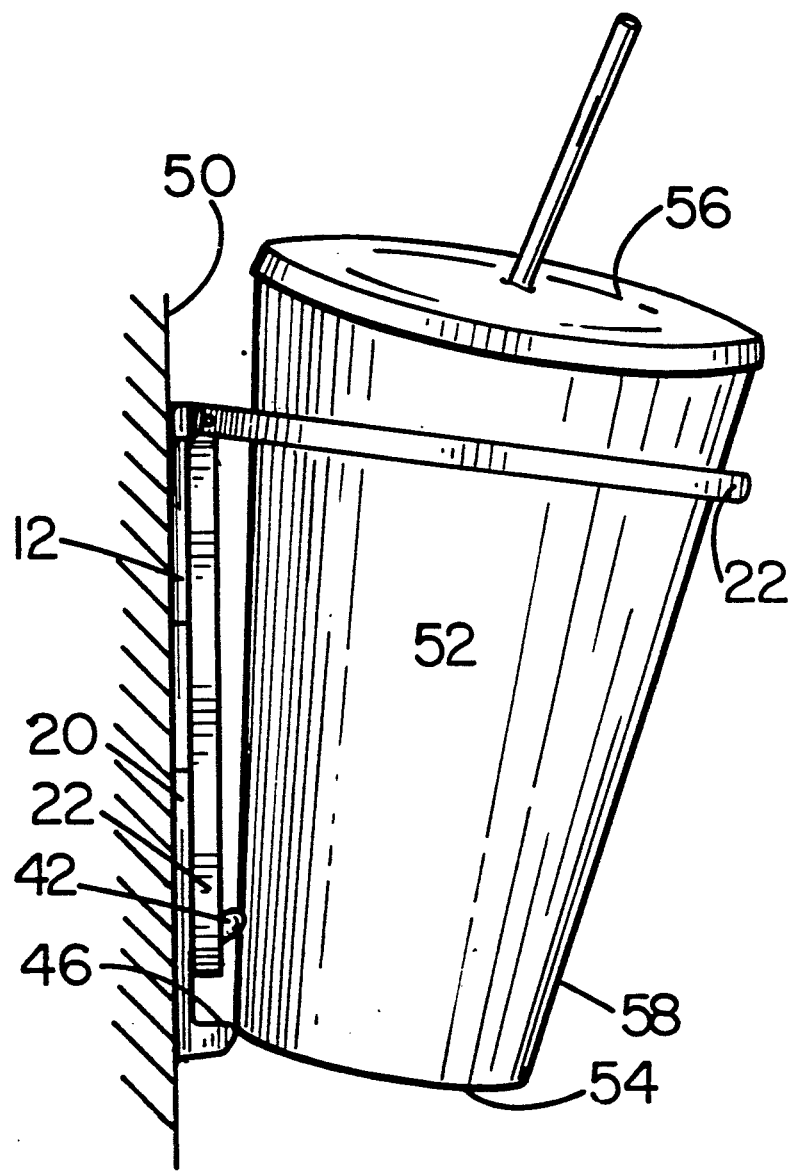
FIG. 4 is a side view of the beverage container holding apparatus holding a large beverage cup.

In FIG. 4 the apparatus is shown holding a cup 52. Cup 52 is of the type conventionally known as a "paper" or "Styrofoam" cup. It is circular in cross section, has a closed bottom 54 and an open top which is shown provided with a lid 56. Cup 52 has a side wall 58 which is outwardly tapered in the direction toward the top of the cup.

Cup 52 would be considered a large cup in a theater or fast food restaurant. To hold it in the holding apparatus of the present invention, outer ring member is moved from the retracted position shown in FIGS. 1 through 3 to the extended position shown in FIGS. 4 and 5. In the extended position ring member 22 and the circumferential edge bounding the opening therein extends generally horizontal. For purposes of this description however it is to be understood that generally horizontal means sufficiently horizontal to enable a cup to be inserted and held without spillage in the manner hereinafter described. With outer ring member 52 in the extended position, cup 52 is inserted bottom first into opening 24. Cup 52 is moved downward until the outer wall 58 of the cup contacts the circumferential edge of the outer ring member. This occurs in a location wherein the diameter of the cup is equal to the aperture diameter of the opening in the ring member. In this position the cup is supported about almost its full circumference. This circumferential support holds the cup sufficiently to prevent even thin paper cups containing beverage from collapsing.

The lower end of cup 52 is steadied by abutting the lower portion 20 of body 12 of the apparatus. Depending on the length of the cup, it may abut finger 42 or tab 56. Although the lower portion of the cup may contact the lower portion of the body of the apparatus, all of the support for the cup is provided by the circumferential edge 25 of outer ring member 22.

Figure 5:
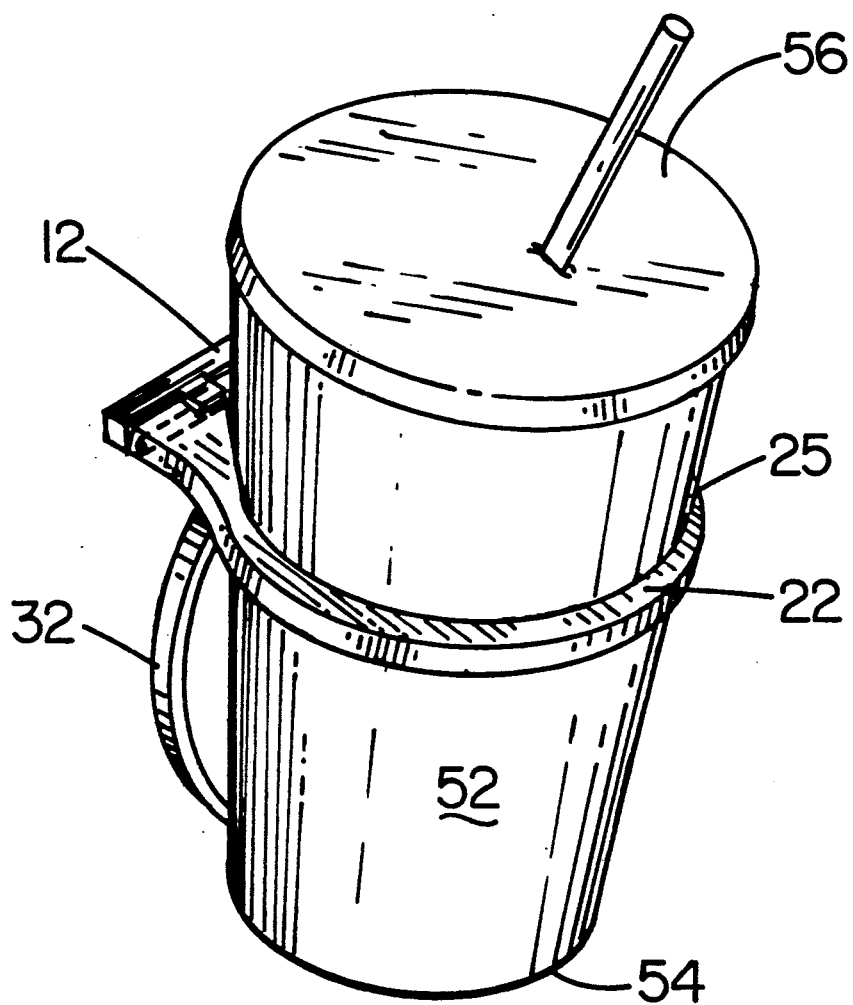
FIG. 5 is a perspective view of the beverage container holding apparatus holding a large cup as shown in FIG. 4.

When the outer ring member 22 is holding large cup 52 as shown in FIGS. 4 and 5, inner ring member 32 is retracted out of the way and is held in place by finger 42.

The outer ring member can be used to hold any cup that has an upper portion that has a diameter larger than the aperture diameter of opening 24, and which has sufficient rigidity in its side wall so it does not collapse when supported by its circumference. Applicants have found that virtually all commercial beverage cups have these properties because they are necessary so that people may hold them in hand. Applicants have further found that it is desirable for the ring to support the cup adjacent the top. If the ring is used to support the cup near the lower portion, it may be possible to have the center of gravity of the beverage in the cup so high above the area of support that the cup will topple out of the ring member. It will be understood for purposes of this description that anywhere at or above the midpoint in height of the cup is sufficiently adjacent the top thereof for properly holding the cup in the apparatus of the present invention.

Figure 6:
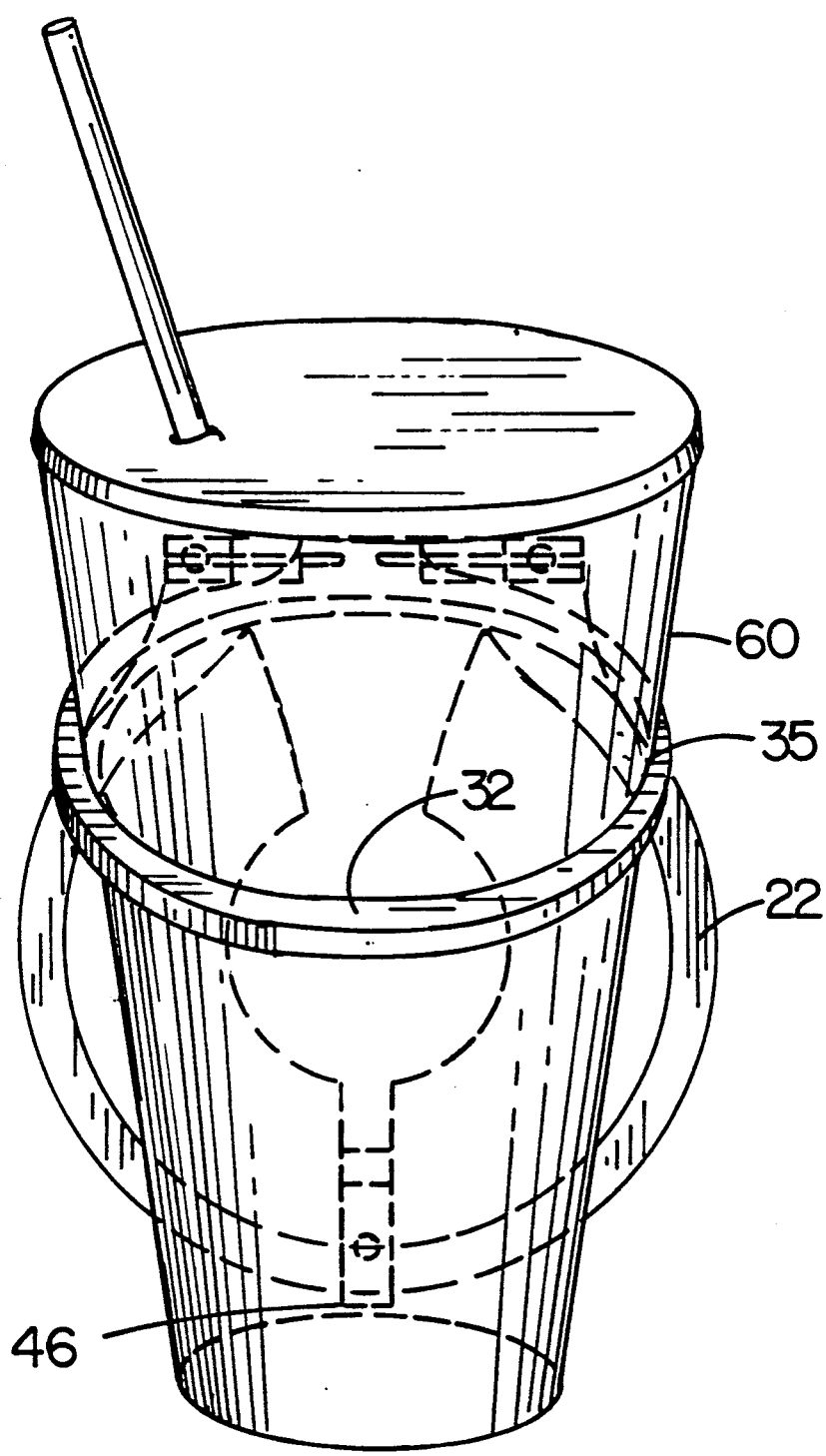
FIG. 6 is a plan view of the beverage container holding apparatus holding a small beverage cup.

The beverage container holding apparatus is shown holding a cup 60 in FIG. 6. Cup 60 is smaller than cup 52 but is of the same configuration. Cup 60 is supported in opening 34 by circumferential edge 35 of inner ring member 32. When small cup 60 is held in the apparatus, outer ring 22 is retracted adjacent body 12 and is held in place by tab 46.

Figure 7:
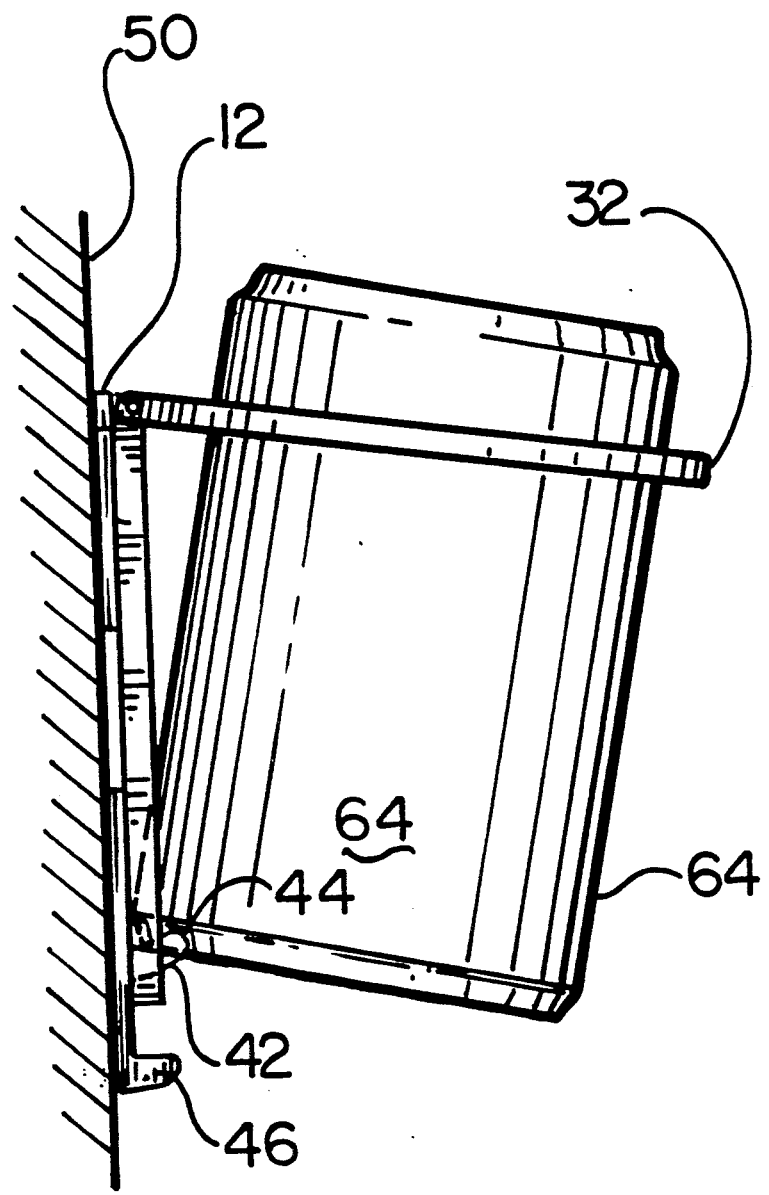
FIG. 7 is a side view of the beverage container holding apparatus holding a conventional aluminum beverage can.

The preferred embodiment of the present invention may also be used to hold standard commercial beverage cans. In FIG. 7 a can 62 is shown held in the holding apparatus. The circular opening 34 in the inner ring member has an aperture diameter slightly than the diameter of outer wall 64 of beverage can 62. This enables the can to be inserted bottom first into the opening. Because the can has a straight side wall instead of a tapered wall like a cup, bottom support must be provided. The circumferential edge 35 of the inner ring member provides support for the can only at the point where the can contacts the edge.

To provide bottom support for can 62, finger 42 of body 12 engages one side of the lower portion of the can. The upturned end 44 of finger 42 is accepted into a recess (not separately shown) in the bottom of the can. Such a recess is common in conventional beverage cans. The construction of the apparatus serves to minimize the risk that the can 62 will fall out of the holder even if bumped or exposed to vibration such as would occur in a vehicle.

The beverage container holding apparatus of the present invention presents the advantage that it can be placed in the retracted position when not in use to conserve space and to prevent it from being damaged or broken.

The beverage container holding apparatus of the present invention may also serve as an advertising medium. Advertising may be printed on the central portion 18 of body 12. Advertising or promotional materials, such as a company logo, are readily viewed through the opening 34 in the inner ring member when the apparatus is in the retracted position. In addition, when beverage containers are being inserted into the apparatus, the advertising in the central portion is in the line of sight of the user. This construction facilitates the effectiveness of the apparatus as an advertising medium.

It will be understood by those skilled in the art that the embodiment of the invention shown in the Figures may also be used in a condition inverted from that shown. In the inverted condition the body will extend vertically above the ring members when the device is in use. In the inverted condition, the device will effectively hold cups, but not cans.

The invention is ideally adapted to be mounted in a recess in a seat back or other surface. This will enable it to be even more compact when not in use. Further, the movable members need not be ring shaped but may have other stylized shapes in other embodiments.

Thus, the new beverage container holding apparatus of the present invention achieves the above stated objectives, eliminates difficulties encountered in the use of prior systems and devices, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is utilized, and the advantages and useful results obtained; the new and useful structures, devices, elements, arrangements, parts, combinations, systems, equipment, operations, methods and relationships are set forth in the appended claims.

We claim:

1. A retractable apparatus for holding beverage cups of various sizes, said cups generally circular in cross section and having a side wall tapered outwardly in a direction from a bottom to a top, said apparatus attached by attaching means to a supporting surface, said supporting surface extending in a generally vertical direction, said apparatus comprising:
   a body;
   a first movable member, said first movable member including a first circular opening therethrough, said first circular opening having a first circumferential edge bounding said opening and a first aperture diameter, said first aperture diameter smaller than an outer diameter of a first cup in a first location adjacent the top thereof;
   first pivot means for connecting said body and said first movable member and for enabling movement of said first movable member between a first position wherein said first movable member extends outward from said supporting surface with said first circumferential edge extending generally horizontal, and a second position wherein said first movable member is adjacent said supporting surface;
   whereby when said first movable member is in the first position said first cup is enabled to be held in said first circular opening in said first movable member and supported generally upright therein about said cup side wall in said first location by said circumferential edge, and in said second position said first movable member is retracted adjacent said supporting surface.

2. The apparatus according to claim 1 wherein said body extends to adjacent a bottom portion of said first cup when said cup is inserted in said apparatus, whereby said cup is supported in a generally horizontal direction by said body.

3. The apparatus according to claim 1 wherein said apparatus is adapted for holding a second cup, said second cup generally circular in cross section and having a second side wall tapered outwardly in a direction from a bottom to a top, said second cup having greater capacity than said first cup, said apparatus further comprising:
   a second movable member including a circular opening therethrough, said circular opening bounded by a second circumferential edge, said opening having a second aperture diameter, said second aperture diameter smaller than an outer diameter of the second cup in a second cup location adjacent the top thereof, and larger than an outer diameter of said first cup adjacent the top thereof; second pivot means for connecting said body and said second movable member and for enabling movement of said second movable member between a first position wherein said second movable member extends outward from said supporting surface with said second circumferential edge generally horizontal, and a second position wherein said second movable member is adjacent said supporting surface;
   whereby said second cup is enabled to be held in said second circular opening and supported generally upright therein about said second side wall in said second location by said second circumferential edge, while said first movable member is in the second position, and in the second position said second movable member is retracted adjacent said supporting surface.

4. The apparatus according to claim 3 wherein said first movable member is adapted to be positioned within the second circular opening of said second movable member when said first and second movable members are both in the second position.

5. The apparatus according to claim 1 wherein said first aperture diameter is slightly larger than an outer diameter of a beverage containing can, said can generally circular in cross section and having a generally straight cylindrical side wall and a bottom extending generally traverse of said cylindrical side wall, said apparatus further comprising:
   protrusion means extending generally outward from said supporting surface vertically below said first pivot means, said protrusion means adapted for engaging said bottom of said can, and wherein when said can is inserted in said first circular opening, the top of said can extends vertically above said first opening as said protrusion means engages a portion of the bottom of said can.

6. The apparatus according to claim 5 wherein said protrusion means is integral of said body.

7. The apparatus according to claim 6 wherein said apparatus is adapted for holding a second cup, said second cup generally circular in cross section and having a second side wall tapered outwardly in a direction from a bottom to a top, said second cup having greater capacity than said first cup, said apparatus further comprising:

a second movable member including a second circular opening therethrough, said second circular opening bounded by a second circumferential edge and having a second aperture diameter, said second aperture diameter smaller than an outer diameter of said second cup in a second cup location adjacent a top thereof, and larger than an outer diameter of said first cup adjacent the top thereof;

second pivot means for connecting said body and said second movable member and for enabling movement of said second movable member between a first position wherein said second movable member extends outward from said supporting surface with said second circumferential edge extending generally horizontal, and a second position wherein said second movable member is adjacent said supporting surface;

whereby said second cup is enabled to be held in said second circular opening supported generally upright therein about said second side wall in said second location by said second circumferential edge, while said first movable member is in the second position; and in the second position said second movable member is retracted adjacent said supporting surface.

8. The apparatus according to claim 7 wherein said first movable member is adapted to be positioned within the second circular opening of said second movable member when said first and second movable members are both in the second position.

9. The apparatus according to claim 8 wherein said protrusion means extends through said first opening of said first movable member when said first movable member is in the second position.

10. The apparatus according to claim 9 wherein said protrusion means is in abutting relation with said first movable member in the second position, whereby said first movable member is held in said second position.

11. The apparatus according to claim 10 wherein said first movable member is generally ring shaped.

12. The apparatus according to claim 11 wherein said first and second movable members have a uniform thickness, whereby said first member is fully nested within said second member when both of said members are in the second position.

13. The apparatus according to claim 12 and further comprising tab means vertically below and abutting said second movable member when said second movable member is in the second position.

14. The apparatus according to claim 13 wherein said tab means comprises an integral tab extending from said body.

15. The apparatus according to claim 14 wherein said first pivot means and said second pivot means pivot about an axis, and said first and second movable members are journaled on a split pin supported by said body.

16. The apparatus according to claim 15 wherein said can bottom includes a recess and said protrusion means includes an upturned end portion, whereby said upturned portion engages the recess in the bottom portion of the can.

17. The apparatus according to claim 16 wherein said protrusion means is a finger integral of said body.

18. A retractable apparatus for holding beverage cups of various sizes, said cups generally circular in cross section and having a cup side wall tapered outwardly from a cup bottom to a cup top, and a beverage containing can, said can being generally circular in cross section and having a straight can side wall, a closed can bottom and a can top with an opening therein, said apparatus held to a supporting surface by holding means, said supporting surface extending generally vertically, said apparatus comprising:

a body;

a first movable member, said first movable member including a first circular opening therethrough, said first circular opening having a first circumferential edge bounding said opening and a first aperture diameter, said first aperture diameter slightly larger than an outer diameter of said can side wall and smaller than an outer diameter of a cup side wall of a first cup in a first location adjacent the cup top thereof;

first pivot means for connecting said body and said first movable member and for enabling movement of said first movable member between a first position wherein said first movable member extends outward from said supporting surface with said first circumferential edge extending generally horizontal and said first opening generally open upward, and a second position wherein said first movable member is adjacent said supporting surface;

protrusion means extending generally outward from said supporting surface vertically below said first pivot means, said protrusion means adapted for engaging a portion of said can bottom; and whereby when said first movable member is in the first position said first cup is enabled to be held in said first circular opening and supported generally upright therein about said cup side wall in said first location by said circumferential edge, and alternatively said can is enabled to be supported in said first circular opening with the top of said can extending vertically above said first opening when said can bottom is in engagement with said protrusion means, and in the second position said first movable member is retracted adjacent said supporting surface.

19. The apparatus according to claim 18 wherein said can includes a recess in the can bottom and the protrusion means includes an upturned end for engaging said recess.

20. The apparatus according to claim 19 wherein said protrusion means is a finger integral of said body.

* * * * *